United States Patent Office 3,793,443
Patented Feb. 19, 1974

3,793,443
METHOD OF PREPARING FERRITES
Ronald H. Arendt, Schenectady, N.Y., assignor to General Electric Company, Schenectady, N.Y.
No Drawing. Continuation-in-part of abandoned application Ser. No. 91,141, Nov. 19, 1970. This application Nov. 29, 1972, Ser. No. 310,354
Int. Cl. C01g 49/00
U.S. Cl. 423—594                                                   3 Claims

ABSTRACT OF THE DISCLOSURE

A magnetoplumbite ferrite in the form of micron- and submicron-size particles having unique magnetic properties is prepared by reacting cation oxides of the ferrite in a solvent of NaCl-KCl in the presence of a source of water.

METHOD OF PREPARING FERRITES

The present invention relates generally to the art of inorganic compound synthesis, and is more particularly concerned with a new method of producing ferrites in the form of micron- and submicron-size powders.

This is a continuation-in-part of my patent application Ser. No. 91,141, now abandoned.

In the production of these compounds, it has been the practice in the art to carry out the synthesizing reactions at high temperature with the reagent oxides in the solid state. However, the reactions do not always proceed substantially to completion, and separation and recovery of the desired product in good yield consequently is often expensive. Moreover, particle size control is often difficult, the products of the solid state reaction tending to be too large.

Recognizing these shortcomings, others have heretofore proposed providing a flux to promote reaction between individual metal oxides at elevated temperatures in the solid state system. Borates, $B_2O_3$, PbO and alkali metal fluorides and chlorides have been tested for this purpose with indifferent results. For instance, efforts to produce lithium ferrite ($LiFe_5O_8$) by reacting $Fe_2O_3$ with $Li_2CO_3$ dissolved in molten LiCl have encountered difficulties in the form of volatility of the chloride at reaction temperature and a marked tendency toward hydrolysis and formation of $Li_2O$ which reacts with $LiFe_5O_8$ to produce less desirable $LiFeO_2$. For these reasons, this chloride approach has recently been dropped in favor of alkali metal sulfates which are nonvolatile and inert toward ferrites.

I have discovered that certain chloride salts and salt mixtures are also free from these drawbacks and can be used to substantial advantage over sulfate salts in the production of magnetoplumbite ferrites and spinel ferrites. I have also discovered that the relative amount of the chloride component of the reaction mixture can be large or quite small, it apparently being essential only that there be enough chloride to provide a liquid or molten film in which the oxide components can dissolve and react to form the desired product. Additionally, I have found that by providing a source of water in the system at elevated temperature, the quality of the ferrite product can be substantially improved. This requirement can be met through the use of $Fe_2O_3 \cdot XH_2O$ (or FeOOH), the entire stoichiometric amount of the iron oxide preferably being in this form to insure the presence of $H_2O$ while the reaction mixture is at elevated temperature. As those skilled in the art know, water from such a source is chemically bound as water of crystallization or water of hydration and in the case of $Fe_2O_3 \cdot XH_2O$ is released at a temperature of about 700° C. This is vitally important in the process of this invention because I have found that it is not possible to obtain the high quality ferrite product by using other water sources such as by maintaining the molten reaction mixture or melt under an atmosphere of moisture-containing air. The in situ source and release of water, in other words, is an essential feature of the method of this invention for the production of high quality and superior magnetic properties (and minimal ferrous content).

Another discovery of mine is that through the use of certain chlorides at elevated temperature, a mixture of cation oxides can be reacted to produce oxide magnetic ferrites in submicron monocrystalline form of very high purity and superior magnetic characteristics.

Briefly described, the process of this invention based upon the foregoing discoveries comprises the steps of heating a mixture of cation oxides of the desired inorganic compound and alkali metal chloride and thereby producing a molten reaction medium, reacting the oxides with each other in the molten reaction medium to form the desired compound, and subsequently cooling the resulting reaction mass and recovering the inorganic compound. The ratio of cation oxides to alkali metal chloride is from one to one to one to 20, respectively, and the ratio of the oxides to each other is suitably, but not necessarily, approximately stoichiometric.

While the alkali metal chloride requirement can be met through the use of sodium chloride or potassium chloride, I have found it preferable to use a 50–50 molar mixture of these salts. Also, the presence of a small amount (about one mol percent) of potassium fluoride is beneficial in that it reduces the viscosity and enhances the solvent powers of the molten salt serving as the solvent for the cation oxides of the mixture.

In preferred practice, the ratio of chloride solvent to the cation oxides of the mixture will be of the order of one part to five parts, respectively. Thus, at any given time in the process, only a small proportion of the entire chloride-oxide mixture is in liquid form and yet the reactions between the oxides proceed at acceptable rates.

The necessity for a source of water in the system at the temperatures at which the reagent oxides are to be reacted is a key feature of this process. The amount of such water is apparently comparatively small, the requirements of the process being met through the use of the water source providing only a mol equivalent for each mol of the iron constituent in the desired ferrite compound. This requirement is preferably met by providing the iron oxide constituent of the cation oxide mixture in the form of $Fe_2O_3 \cdot XH_2O$ or as FeOOH. A substantial excess of water over that necessary to produce the new results of this invention can be used without detrimental effect on the quality or yield of the desired ferrite product. Thus, the functions of water in this process are to prevent or block any tendency for the iron of the ferrite to be reduced to any significant extent to the ferrous state and to promote the solution of the $Fe_2O_3$ in the molten salt solvent. The process of this invention can be carried out in the absence of a source of such water to produce ferrite product, where yields can approach 100 percent, but the quality of the product in terms of desired magnetic characteristics is invariably inferior to that of the product prepared in the presence of the high-temperature water source, which has a much lower ferrous iron content. Also, it has been observed that the latter product is comparatively free of the crystal imperfections which characterize products of greater ferrous iron content.

The cation oxides may be provided as such in preparing a mixture for reaction acording to this invention, or sources of such oxides may be employed. Thus, it is contemplated that the corresponding carbonates or nitrates may be used, the oxide being provided as calcining occurs during the process of bringing the mixture up to reaction temperature.

The minimum temperature to which the reaction mixture of cation oxides, carbonates or nitrates and chloride solvent is heated will depend upon the nature of the chloride solvent, that is, its melting-point temperature, it being essential that the solvent be in the liquid or molten phase. With some salt mixtures, this minimum can be as low as 500° C. In general, however, the operating temperature during the period that reactions of this process are going on will be 1000° C. or higher. Temperatures somewhat below the more or less optimum 1000° C. level lead to smaller yields of the desired inorganic compound reaction product because of incomplete decomposition of cation oxide sources. Higher temperature operation, on the other hand, assures complete reaction in reasonably short periods of time such as of the order of 30 minutes in the case of the 1000° to 1050° C. operating temperature. The time-temperature relationship will be understood by those skilled in the art to vary inversely the higher temperatures requiring shorter periods of time for the same reaction efficiency and product yield. The upper limit of temperature as a practical matter will be about 1100° C. Further, there is no upper limit of time at operating temperature other than the practical or economic limit that the operator wishes to impose. Prolonged heating at operating temperature, however, can lead to reduction in the quality of the ultimate product because of the loss of protection against reduction of the iron component to the ferrous state as water is exhausted from the reaction mixture or as the sovent evaporates from the mixture.

When the heating period is concluded, the reaction mixture may be furnace-cooled, air-cooled or even water-quenched to room temperature. Separation of the desired product from the remaining constituents of the reaction mixture, including chloride solvent and unreacted cation oxide compounds when water soluble, can then be carried out. Preferably, the reaction mixture is subjected after air-cooling to contact with water to leach out and remove the water-soluble chloride solvent. In the case where the process results in substantially complete reaction of the reagent oxides, this removal of water-soluble constituents will leave the water-insoluble product ferrite in substantially pure form uncontaminated by other materials physically or chemically associated with it, and the product will be in the form of micron- or submicron-size, monocrystalline powder particles. It has been found that because of the fact that the reactions take place in the liquid or molten medium, the reaction product in each instance is a precipitate. Actually, this precipitate is in the form of crystallites of the desired inorganic compound, crystallization apparently occurring more or less continuously as the reagent oxides are dissolved and reacted with each other in the fused salt solvent which becomes a saturated or even a supersaturated solution of the reaction product as the process proceeds, or as the reaction mixture is cooled.

In the production of oxide magnetic (or magnetoplumbite) ferrite products by this process, one obtains a powder consisting of regular hexagonal platelet particles of the hexagonal ferrite. Each of these particles is of submicronic size, being less than one-half micron thick and having a basal plane transverse major dimension not greater than about 1.5 micron. Further, in the case of $BaFe_{12}O_{19}$, these particles have characteristically a saturation magnetization of about 72 gauss per gram and intrinsic coercive force from 2000 up to 4100 oersteds.

The following illustrative, but not limiting, examples of this invention as it has actually been carried out will enable a further and better understanding of this invention by those skilled in the art.

EXAMPLE I

A 100-gram, substantially uniform mixture of $Co_2O_3$ and $Fe_2O_3$, NaCl and KCl, all of particle size approximating 1.5 micron, was prepared in which the proportions were as follows:

| | Grams |
|---|---|
| $Co_2O_3$ | 7 |
| $Fe_2O_3 \cdot XH_2O$ | 13 |
| NaCl | 35.14 |
| KCl | 44.86 |

This mixture was heated in a platinum crucible at 800° C. for three hours, and then heated to 1000° C. in 10 minutes and held at that temperature for two hours, after which it was air-cooled to room temperature and washed with distilled water. The residue from the water washing was an insoluble ferrite product of very fine particle size, i.e., less than about one micron. The product also proved to be highly magnetic, having the appropriate Neel temperature and saturation magnetization. X-ray and chemical analysis established that the product was $CoFe_2O_4$ in the spinel structure with the correct lattice parameter.

EXAMPLE II

In another test, $BaO \cdot 6Fe_2O_3$ was prepared using a 100-gram mixture of 1.5 micron-size powders of the following proportions:

| | Grams |
|---|---|
| $BaCO_3$ | 3 |
| $Fe_2O_3 \cdot XH_2O$ | 17 |
| NaCl | 35.14 |
| KCl | 44.86 |

This substantially uniform mixture was heated to 1000° C. for one hour and then air-quenched to room temperature. The chloride solvent was again removed by a distilled water leaching operation leaving a fine-particle product having the following magnetic characteristics:

$H_{ci} \cong 3200$ Oe.
$B_s = 72$ emu g.$^{-1}$ (at 298° K.)

EXAMPLE III

In a substantial repetition of the procedure of Example II, a series of test runs were made to determine the effect of varying the proportions of the solvent and cation oxides of the reaction mixture. In each instance, $BaFe_{12}O_{19}$ was the desired product and a 50–50 eutectic mixture of NaCl-KCl was employed as the solvent, as in the case of Example II. In Sample A, the weight percent solvent amounted to 80% of the total mixture while in Sample B tests, 70% and Sample C, 60%, and Sample D, 50%. All these runs were carried out at a firing temperature of 1000° C. for one hour in air and the reaction mixtures were air-quenched and leached with distilled water as described in the foregoing examples. The products of these several samples had the following coercive force values:

| Sample: | $I^{H_c}$(Oe) |
|---|---|
| A | 3220 |
| B | 3500 |
| C | 3290 |
| D | 3400 |

EXAMPLE IV

In another operation like that described in Example II, $SrO \cdot 6Fe_2O_3$ was prepared from a 100-gram mixture of 1.5 micron-size powders of the following proportions:

| | Grams |
|---|---|
| $SrCO_3$ | 3 |
| $Fe_2O_3 \cdot XH_2O$ | 17 |
| NaCl | 35.14 |
| KCl | 44.86 |

Following the heating procedure of Example II, the reaction mixture was air-quenched to room temperature and then washed with water to remove the soluble salts. The residue of fine particles comprising the desired product was tested with results closely comparing to those stated in Example I.

What I claim as new and desire to secure by Letters Patent of the United States is:

1. The method of preparing cobalt barium or strontium ferrite in the form of free-flowing powder which comprises the steps of mixing together in finely-divided form FeOOH and cation oxide of the desired ferrite and alkali metal chloride solvent for the FeOOH and cation oxide in the proportion to each other of from one to twenty parts of the said FeOOH plus oxide to twenty parts to one part of the said solvent, heating the resulting mixture to a temperature of about 700° C. to melt the solvent, to provide for the release of water of crystallization from FeOOH, to provide a reaction medium in the heated mass and to cause the FeOOH and cation oxide to dissolve in the reaction medium and to react with each other to form the desired ferrite, thereafter cooling the resulting reaction mass, and recovering the cobalt, barium or strontium ferrite product in powder form by leaching the chloride solvent and separating and removing the said ferrite product from the resulting salt solution.

2. The method of claim 1 in which the ferrite is $BaFe_{12}O_{19}$ and the cation oxide is BaO.

3. The method of claim 1 in which the inorganic compound is $SrO \cdot 6Fe_2O_3$ and the cation oxide is SrO.

References Cited

UNITED STATES PATENTS

| 3,115,469 | 12/1963 | Hamilton | 423—594 |
| 2,904,395 | 9/1959 | Downs et al. | 423—594 |
| 2,841,470 | 7/1958 | Berry. | |
| 3,509,057 | 4/1970 | Greger | 423—594 X |
| 2,370,443 | 2/1945 | Biefeld | 423—594 X |
| 3,113,109 | 12/1963 | Brixner | 423—594 |

OTHER REFERENCES

Beck et al., APC Published Application, S.N. 292,742, July 13, 1943.

HERBERT T. CARTER, Primary Examiner